(12) United States Patent
Mercier (10) Patent No.: US 9,677,962 B2
(45) Date of Patent: Jun. 13, 2017

(54) ELECTROMAGNETIC RESONATOR PRESSURE SENSOR

(71) Applicant: Commissariat à l'énergie atomique et aux énergies alternatives, Paris (FR)

(72) Inventor: Denis Mercier, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 229 days.

(21) Appl. No.: 14/534,612

(22) Filed: Nov. 6, 2014

(65) Prior Publication Data

US 2015/0128712 A1    May 14, 2015

(30) Foreign Application Priority Data

Nov. 6, 2013 (FR) ..................... 13 60880

(51) Int. Cl.
| | |
|---|---|
| *G01L 9/00* | (2006.01) |
| *G01L 11/06* | (2006.01) |
| *G01L 7/00* | (2006.01) |
| *G01L 21/00* | (2006.01) |
| *G01L 21/10* | (2006.01) |

(52) U.S. Cl.
CPC ............ *G01L 9/0008* (2013.01); *G01L 21/10* (2013.01)

(58) Field of Classification Search
CPC . G01L 9/00; G01L 9/0008; G01L 7/00; G01L 21/00; G01L 21/10; G01L 11/00; G01L 11/06
See application file for complete search history.

(56) References Cited

U.S. PATENT DOCUMENTS

| | | | |
|---|---|---|---|
| 5,633,465 A | 5/1997 | Kaufmann et al. | |
| 5,677,631 A * | 10/1997 | Reittinger | ............ E21B 47/102 |
| | | | 324/324 |
| 2010/0321191 A1* | 12/2010 | Gong | ..................... G01N 22/02 |
| | | | 340/584 |
| 2011/0107838 A1 | 5/2011 | Suijlen et al. | |
| 2012/0038461 A1* | 2/2012 | Forster | ............ G06K 19/07749 |
| | | | 340/10.1 |

FOREIGN PATENT DOCUMENTS

| | | |
|---|---|---|
| EP | 0144630 | 6/1985 |
| EP | 1944595 | 7/2008 |
| EP | 2330396 | 6/2011 |
| WO | 2004025237 | 3/2004 |
| WO | 2012103942 | 8/2012 |

OTHER PUBLICATIONS

Lin et al., "An Integrated Thermo-Capacitive Type MOS Flow Sensor," IEEE Electron Device Letters 17:5 pp. 247-249 (1996).

* cited by examiner

*Primary Examiner* — Nguyen Ha
(74) *Attorney, Agent, or Firm* — Occhiuti & Rohlicek LLP (57) ABSTRACT

The invention relates to a pressure sensor including an electromagnetic resonator with waveguide having a dielectric material with a dielectric permittivity that varies with temperature. There is an excitation circuit configured to propagate an electromagnetic field through the resonator and a device for heating the resonator. There is also a device for detecting the electromagnetic resonant frequency of the resonator and a device for determining the pressure of the gas surrounding the sensor as a function of the detected resonant frequency of the resonator.

15 Claims, 4 Drawing Sheets

ELECTROMAGNETIC RESONATOR PRESSURE SENSOR

RELATED APPLICATIONS

Under 35 USC 119, this application claims the benefit of the Nov. 6, 2013 priority date of French application FR 1360880, the contents of which are herein incorporated by reference in its entirety.

FIELD OF INVENTION

The invention relates to pressure sensors, particularly pressure sensors for pressure levels below atmospheric pressure.

BACKGROUND

A certain number of pressure sensors, for measuring the pressure of a gas that is below atmospheric pressure, are known.

U.S. Pat. No. 5,633,465 describes a Pirani-type pressure sensor based on an electric conductor or semiconductor. The electric conductor is immersed in the gas the pressure of which is measured. The electric conductor is heated to a temperature above the temperature of the gas in which it is immersed. The electric conductor loses heat by conduction to the molecules of gas in which it is immersed. The heat flux exchanged between the electric conductor and the gas is higher or lower according to the pressure of this gas, the thermal conductivity of which varies with pressure. As a result, the temperature of the electric conductor varies as a function of the gas pressure. The electrical resistance of the conductor is modified by this variation in temperature. A circuit measures this electrical resistance. This circuit therefore determines the pressure of the gas as a function of the electrical resistance measured.

Such a sensor relies on the temperature coefficient of resistance of materials of which the electric conductor is made. As this coefficient is usually below 1%, the sensor has low sensitivity. Furthermore, the measurement range of this sensor is limited. This is because since the electric resistance varies weakly with pressure, the noise on the measurement of the resistance has an order of magnitude close to the variation in resistance induced by the variation in pressure when the pressures to be measured are below $10^{-2}$ Pa or above $10^4$ Pa.

Document US20110107838 describes a pressure sensor of the MEMS type with mechanical resonance. This sensor comprises a vibrating beam suspended in the gas the pressure of which is measured. The beam is actuated by electrodes. A variation in gas pressure modifies the mechanical quality factor of the beam. The frequency of mechanical resonance of the excited beam and the amplitude of oscillation thereof are therefore modified. By analysing the movement of the beam, the document deduces its mechanical resonant frequency thereof and from this extrapolates the gas pressure.

Such a sensor has the disadvantage of operating over only a fairly narrow operating range and is not suited to measure high levels of vacuum (pressures of below $10^{-1}$ Pa for example).

Document EP0144630 describes, amongst other things, a pressure measurement device. In one example, a liquid-crystal cell is excited by a light source. Liquid crystal reflection spikes are measured in order to deduce a temperature of a surrounding fluid, the reflected wavelength varying with this temperature. The liquid crystal cell forms a Bragg reflector and not an electromagnetic resonator.

Document EP1944595 describes a gas pressure measurement device based on an acoustic resonator. Such a device has a limited accuracy and a limited measurement range.

Document WO2012/103942 describes a gas pressure measurement device, likewise based on an acoustic resonator. Such a device therefore also has a limited accuracy and a limited measurement range.

Thus, no satisfactory solution for offering high sensitivity, with a broad pressure measurement range and a relatively simple and easy-to-produce structure has been identified.

SUMMARY OF INVENTION

The invention seeks to address one or more of these disadvantages. Thus the invention relates to a pressure sensor, comprising:
  an electromagnetic resonator with waveguide comprising a dielectric material having a dielectric permittivity that varies with temperature;
  an excitation circuit configured to propagate an electromagnetic field through the resonator;
  a device for heating the resonator;
  a device for detecting the electromagnetic resonant frequency of the resonator;
  a device for determining the pressure of gas surrounding the sensor as a function of the detected resonant frequency of the resonator.

According to an alternative form, the dielectric material has a temperature coefficient of dielectric permittivity at least equal to 80 ppm/° C.

According to another alternative form, the dielectric material has a crystalline structure of the perovskite type.

According to another alternative form, the dielectric material comprises a superposition of several layer of materials of which at least one has a dielectric permittivity that varies with temperature.

According to yet another alternative form, the sensor comprises a cavity created to receive a gas, the pressure of which is to be measured, the radiofrequency resonator being at least partially housed in this cavity.

According to an alternative form, the resonator comprises a face referred to as the front face and an opposite face referred to as the rear face, the front face being positioned in the cavity in direct contact with the gas the pressure of which is to be measured, and the rear face is arranged outside the cavity.

According to another alternative form, the device for heating the resonator is configured to heat the dielectric material to a temperature of between 80 and 200° C.

According to another alternative form, the heating device comprises a heating resistance in contact with the dielectric material.

According to yet another alternative form, the device for detecting the electromagnetic resonant frequency of the resonator measures the frequency of electrical resonance of an oscillating circuit including the resonator and the excitation circuit.

According to an alternative form, the resonator is a resonator with waveguide of the dielectric type, comprising:
  a block of dielectric material;
  two conducting electrodes electromagnetically coupled to the block, the excitation circuit being connected to the electrodes.

According to another alternative form, the resonator is a resonator with waveguide of the micro strip type, comprising a conducting micro strip, a ground plane made of conducting material, the dielectric material that has a dielectric permittivity that varies with temperature is arranged between the ground plane and the conducting micro strip;

the detection device and the excitation circuit comprise at least one conducting electrode electromagnetically coupled to the micro strip via the dielectric material.

According to another alternative form, the resonator is a resonator with waveguide of the coplanar type, comprising:

a conducting micro strip;

two ground traces on the same plane as the conducting micro strip;

a dielectric on which the two ground traces and the conducting micro strip are arranged;

and the detection device and the excitation circuit comprise at least one conducting electrode electromagnetically coupled to the micro strip and to the two ground traces.

According to another alternative form, the sensor comprises two conducting electrodes, the detection device and the excitation circuit respectively comprising one of the electrodes.

According to an alternative form, the excitation circuit is configured to propagate an electromagnetic field at a frequency at least equal to 100 MHz through the resonator.

The invention also relates to a method for measuring the pressure of a gas, comprising:

the placing of an electromagnetic resonator in thermal contact with the gas, the waveguide resonator including a dielectric material that has a dielectric permittivity that varies with temperature;

the heating of the resonator;

the electromagnetic excitation of the resonator;

the detection of the electromagnetic resonant frequency of the resonator and the determining of the pressure of the gas as a function of the detected electromagnetic resonant frequency.

Further features and advantages of the invention will become clearly apparent from the description thereof given.

The invention proposes to form a pressure sensor from a (radiofrequency) electromagnetic resonator with waveguide including a dielectric material that has a dielectric permittivity that varies with temperature. The resonator (and the dielectric material in particular) is heated to a temperature above the temperature of the gas the pressure of which is to be measured.

DETAILED DESCRIPTION

Thus, as the pressure varies, the temperature of the (heated) dielectric material varies and causes a variation in the permittivity of the dielectric through which electromagnetic waves originating from an excitation circuit propagate. The variation in permittivity therefore leads to a variation in the speed at which the electromagnetic waves propagate, and this results in a variation in the resonant frequency of the resonator, making it possible to determine the variation in pressure.

Figure 1:
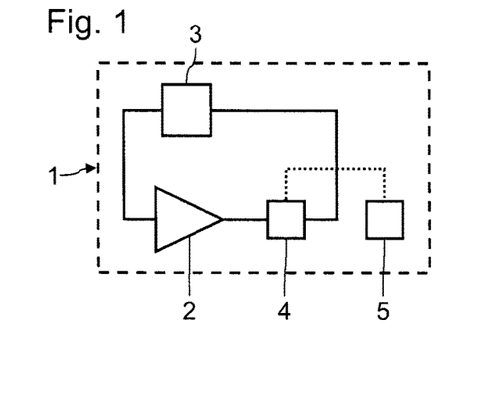
FIG. 1 is a schematic representation of a first example of a sensor for implementing the invention.

FIG. 1 is a schematic representation of a first example of a pressure sensor 1 for implementing the invention. The pressure sensor 1 comprises an oscillator including an active system 2 and a resonator 3. The active system 2 is intended to excite the resonator 3 so as to obtain oscillations at a frequency that is defined by the sizing of the resonator 3.

In the example of FIG. 1, a device 4 measures the frequency of electrical resonance of the oscillator, for example by measuring the electromagnetic wave propagated between the active system 2 and the resonator 3. The value of the resonant frequency is supplied to a pressure determining device 5. The device 5 determines the pressure of the gas surrounding the sensor 1 as a function of the resonant frequency measured by the device 4. This pressure is notably calculated from the heat exchanged between the resonator 3 and the gases the pressure of which is being measured, as detailed hereinafter.

Various structures of resonator 3 will be detailed hereinafter. In these structures, the resonator 3 comprises a waveguide including dielectric material that has a dielectric permittivity that varies with temperature. The active system 2 excites this waveguide in order to propagate a radiofrequency electromagnetic field therethrough. A heating device is also used to heat the resonator. By determining the amount of heat exchanged between the gas and the waveguide it is possible to determine the pressure of the gas in thermal contact with the resonator.

Figure 2:
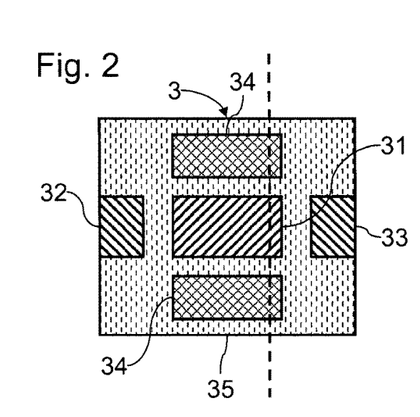
FIGS. 2 and 3 are, respectively, a view from above and a view in cross section of a first embodiment of a resonator for a sensor according to the invention.
Figure 3:
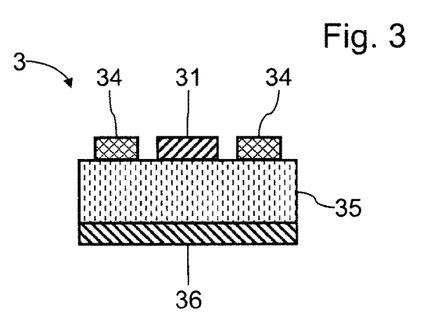

FIG. 2 is a schematic view from above of a first alternative form of the first embodiment of a resonator 3. FIG. 3 is a view in cross section of this resonator 3, designed from a waveguide of the micro strip type. Thus, the resonator 3 comprises:

a layer of dielectric material 35;

an elongated conducting band 31 formed on an upper surface of the layer of dielectric material 35;

excitation electrodes 32 and 33 formed on the upper surface of the layer of dielectric material 35, on either side of the conducting band 31;

a heating device provided with heating resistances 34 which are formed on the upper surface of the layer of dielectric material 35, transversely either side of the conducting band 31;

a conducting layer 36 is formed on a lower surface of the layer of dielectric material 35. The conducting layer 36 forms a radiofrequency ground plane of the micro strip waveguide. The waveguide includes the conducting band 31, the conducting layer 36 and the dielectric material 35.

The electrodes 32 and 33 are electromagnetically coupled to the conducting band 31. The active system 2 is connected to the electrodes 32 and 33 to include the resonator 3 in the oscillating circuit. The active system 2 generates and propagates a radiofrequency electromagnetic field through the micro strip waveguide. Via the heating resistances 34 (for example driven by a control circuit that has not been illustrated), the resonator (including the layer of dielectric material 35) is heated to a temperature above the temperature of the gas the pressure of which is to be measured. The resonator is in thermal contact with the gas the pressure of which is to be measured.

Because of its temperature coefficient of permittivity, the speed with which electromagnetic waves are propagated through the dielectric material 35 varies as a function of temperature. By heating the dielectric material 35 using the resistances 34, the amount of heat transmitted by the resonator to the gas the pressure of which is to be measured can be determined. This is because the temperature of the resonator varies as a function of the amount of heat absorbed by the gas. The amount of heat absorbed by the gas is dependent on the thermal conductivity of the gas, this thermal conductivity being proportional to the pressure of the gas. This variation in temperature therefore modifies the value of the dielectric permittivity in the layer of dielectric material 35, and therefore the speed at which the electromagnetic field propagates through this layer of dielectric material 35. As a result, the electromagnetic resonant frequency of the resonator 3 is modified by a variation in gas pressure. By determining this electromagnetic resonant frequency, it therefore becomes possible to determine the gas pressure on the sensor 1.

The heating device may, for example, apply a constant heating power to the layer of dielectric material 35, the device for determining the gas pressure 5 then determining this gas pressure from the electromagnetic resonant frequency determined for the resonator 3.

In the example of FIGS. 2 and 3, the band 31 has a $\lambda/2$ configuration, where $\lambda$ is the wavelength propagated along the waveguide.

The resonant frequency fr of the resonator 3 is therefore defined by the following relationship: $fr = c/(\lambda * \sqrt{\in r})$
Where c is the speed of light in the vacuum and $\in r$ is the dielectric constant of the waveguide.

Because the value of the permittivity $\in r$ of the layer of dielectric material 35 is dependent on the temperature, determining the resonant frequency fr of the resonator 3 thus makes it possible to extrapolate the pressure of the gas.

Simulations have been conducted with a resonator 3 according to FIGS. 2 and 3, using the following parameters: a layer of dielectric material 35 made of BST (($Ba_x, Sr_y$)$TiO_3$) with a thickness of 2 μm, a conducting band 31 with a width of 10 μm and a wavelength of 1 mm.

At a pressure of $10^{-3}$ Pa, the temperature of the dielectric layer 35 is 140° C., which results in a relative permittivity of the layer of dielectric material 35 of 250. The simulated resonant frequency fr is therefore 20.75 GHz.

At atmospheric pressure, the temperature of the layer of dielectric 35 is 60° C., which results in a relative permittivity of the layer of dielectric material 35 of 500. The simulated resonant frequency is therefore 14.67 GHz.

The temperature coefficient of frequency TCF is therefore equal to 5178 ppm/° C.

Figure 4:
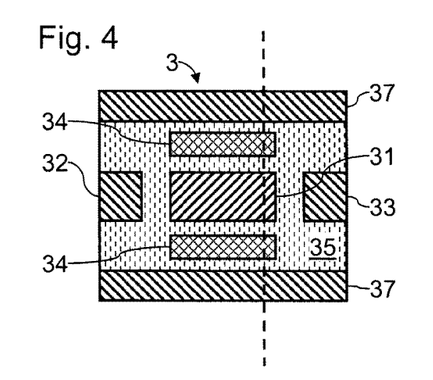
FIGS. 4 and 5 are, respectively, a view from above and a view in cross section of a second embodiment of a resonator for a sensor according to the invention.
Figure 5:
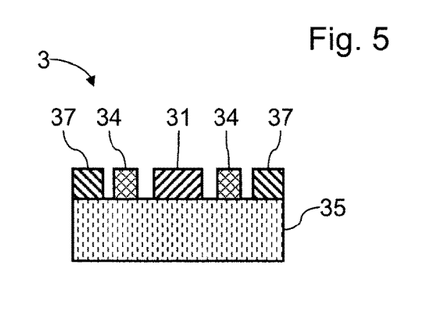

FIG. 4 is a schematic view from above of a first alternative form of a second embodiment of a resonator 3. FIG. 5 is a view in cross section of this resonator 3, designed on the basis of a waveguide of the coplanar type. The resonator 3 thus comprises:

a layer of dielectric material 35;

an elongated conducting band 31 formed on an upper surface of the layer of dielectric material 35 which is the coplanar waveguide signal conductor;

excitation electrodes 32 and 33 formed on the upper surface of the layer of dielectric material 35; longitudinally on either side of the conducting band 31;

a heating device provided with heating resistances 34 which are formed on the upper surface of the layer of dielectric material 35, transversely on either side of the conducting band 31;

conducting bands 37 formed on the upper surface of the layer of dielectric material 35, transversely on either side of the assembly including the conducting band 31, the electrodes 32 and 33 and the heating resistances 34. The conducting traces 37 are the radiofrequency ground planes of the coplanar waveguide.

The electrodes 32 and 33 are electromagnetically coupled to the conducting band 31. The active system 2 is connected to the electrodes 32 and 33 to include the resonator 3 in the oscillating circuit. The active system 2 generates and propagates a radiofrequency electromagnetic field through the coplanar waveguide. Via the heating resistances 34, the resonator is heated to a temperature above the temperature of the gas the pressure of which is to be measured. The resonator is in thermal contact with the gas the pressure of which is to be measured.

The way in which the pressure is measured here is substantially identical to the way described with reference to the embodiment of FIGS. 2 and 3.

Figure 6:
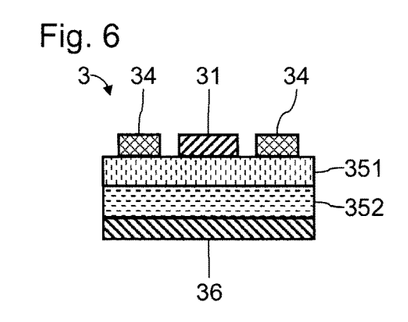
FIGS. 6 to 10 are views in section of various alternative forms of resonator according to the first embodiment.

FIG. 6 is a view in cross section of a second alternative form of the first embodiment of the resonator 3. In this alternative form, the layer of dielectric material 35 with a dielectric constant that varies with temperature is replaced by the superposition of several different dielectric layers. In this particular instance, a dielectric layer 351 and a dielectric layer 352 are superposed. By using layers 351 and 352 made of dielectric materials that have different temperature coefficients of permittivity, the equivalent temperature coefficient of permittivity of the waveguide can easily be adapted. This material may be laid down in several superposed layers according to the dielectric material chosen for the waveguide and according to the method of manufacture of such a dielectric material.

Figure 7:
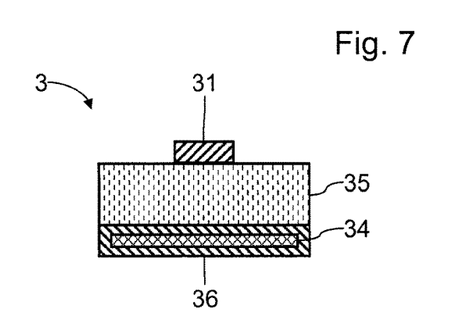

FIG. 7 is a view in cross section of a third alternative form of the first embodiment of resonator 3. In this alternative form, the resistances 34 present on the upper surface of the layer of dielectric material 35 in the first alternative form are replaced by an electric resistance 34 housed within the conducting layer 36.

Figure 8:
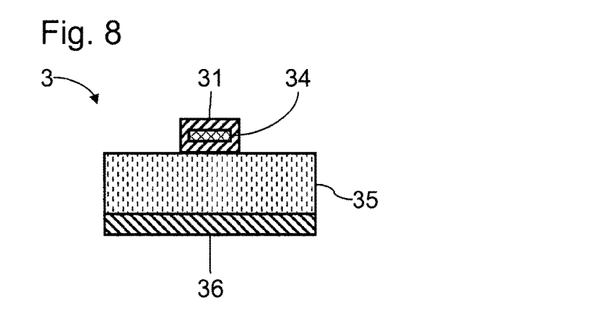

FIG. 8 is a view in cross section of a fourth alternative form of the first embodiment of resonator 3. In this alternative form, the resistances 34 present on the upper surface of the layer of dielectric material 35 in the first alternative form are replaced by an electric resistance 34 housed within the conducting band 31.

In the alternative forms of the first and second embodiments detailed hereinabove, the conducting band 31 has a $\lambda/2$ configuration. It is also conceivable for the conducting bands 31 to have $\lambda/(2*X)$ configurations where X is an integer for example equal to 2.

In the alternative forms of the first and second embodiments which have been detailed hereinabove, the conducting band 31 has a rectangular or linear shape.

Other configurations of the conducting band 31 may be conceived of, notably with a view to reduce the space occupied by the resonator 3.

Figure 9:
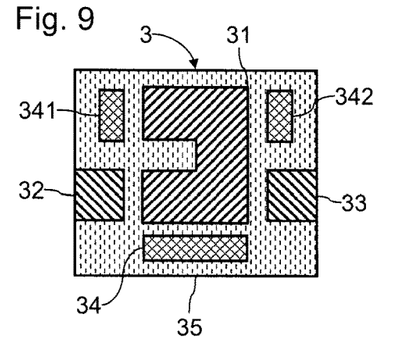

FIG. 9 illustrates a view from above of a fifth alternative form of the first embodiment of resonator 3. In this alternative form, the conducting band 31 is of non-rectilinear shape, in this instance shaped as a U. The electrodes 32 and 33 are positioned longitudinally on either side of a first branch of the U. A heating resistance 34 is positioned transversely next to this first branch. Other heating resistances 341 and 342 are arranged on the layer of dielectric material 35, longitudinally on either side of the second branch of the U.

Figure 10:
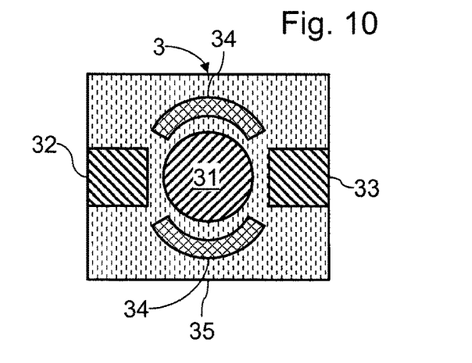

FIG. 10 illustrates a view from above of a sixth alternative form of the first embodiment of resonator 3. In this alternative form, the resonant element 31 has an elliptical shape (in this instance a circular shape). The electrodes 32 and 33 are arranged longitudinally on either side of the resonant element 31. To encourage heating of the dielectric, material 35 near the resonant element 31, the heating resistances 34 have a shape that is curved according to the contour of the resonant element 31. The heating resistances 34 are positioned transversely on either side of the resonant element 31.

Advantageously, the heating device may comprise a heating resistance in contact with, where appropriate, the micro strip and/or the ground planes or ground traces.

Figure 11:
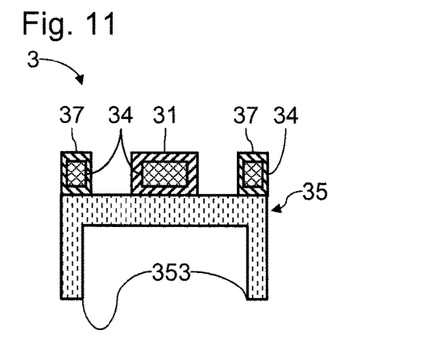
FIGS. 11 and 12 are views in section of alternative forms of resonator according to the second embodiment.
Figure 12:
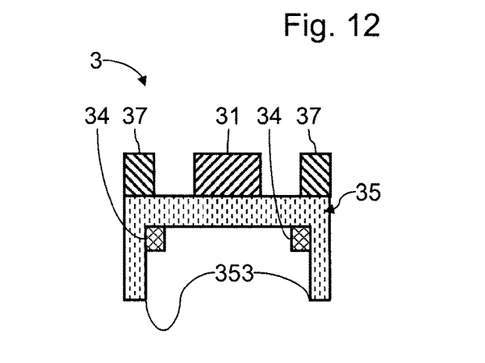

FIGS. 11 and 12 illustrate second and third alternative forms of the second embodiment, in which a cavity has been created in the rear face, the gas the pressure of which is to be measured at least being present in this cavity. The cavity is bounded by walls 353. Advantageously, the layer of dielectric material 35 has a thickness that is small enough to reduce the thermal inertia and thermal response time of the resonator 3.

In the alternative form of FIG. 11, heating resistances 34 are positioned respectively on the inside of the conducting traces 37 and of the conducting band 31.

In the alternative form of FIG. 12, heating resistances are positioned on the lower surface of the layer of dielectric material 35.

Figure 13:
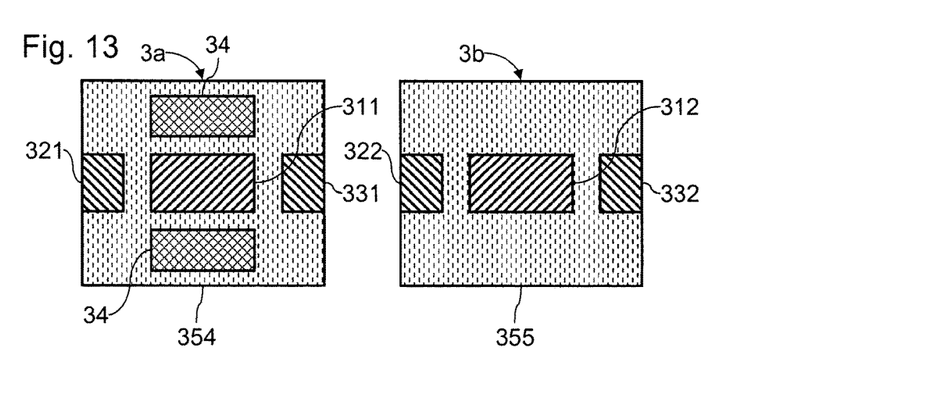
FIG. 13 is a view from above of two resonators included in one and the same sensor according to an alternative form.

FIG. 13 illustrates two resonators 3a and 3b of an alternative form of sensor 1. In this alternative form 1, the device for determining the gas pressure determines the pressure as a function of a measurement of the differential between the respective resonant frequencies of the resonators 3a and 3b. Such a differential measurement means that the sensor 1 can be rendered insensitive to any potential variations in the temperature of the gas the pressure of which is to be measured. For that, the device 4 determines the respective resonant frequencies of the resonators 3a and 3b. The resonators 3a and 3b comprise respective layers of dielectric material 354 and 355 the dielectric permittivity of which varies identically with temperature. The two resonators 3a and 3b are in thermal contact with the same gaseous environment the pressure of which is to be measured. The resonator 3a is heated by heating resistances 34 arranged transversely on either side of the conducting band 311. The resonator 3a in this particular instance is identical to the resonator of the first alternative form of the first embodiment. By contrast, the resonator 3b has no heating device.

The resonators 3a and 3b are excited by an active system 2, via their electrodes 321, 331 and 322, 332 respectively. The excitation electrodes 321 and 331 are formed on the upper surface of the layer of dielectric material 354, longitudinally on either side of the conducting band 311. The electrodes 321 and 331 are electromagnetically coupled to the conducting band 311. The excitation electrodes 322 and 332 are formed on the upper surface of the layer of dielectric material 355, longitudinally on either side of the conducting band 312. The electrodes 322 and 332 are electromagnetically coupled to the conducting band 312.

Advantageously, a resonator 3 used in a sensor 1 according to the invention has an enclosure delimiting a chamber intended to receive the gas the pressure of which is to be measured. The resonator 3 is therefore arranged in this chamber. Such a chamber makes it possible firstly to protect the resonator 3 from impacts and also to set the measurement range of the sensor 1. The smaller the volume of the chamber, the more the maximum sensitivity of the sensor 1 will be offset towards high pressure values.

Figure 14:
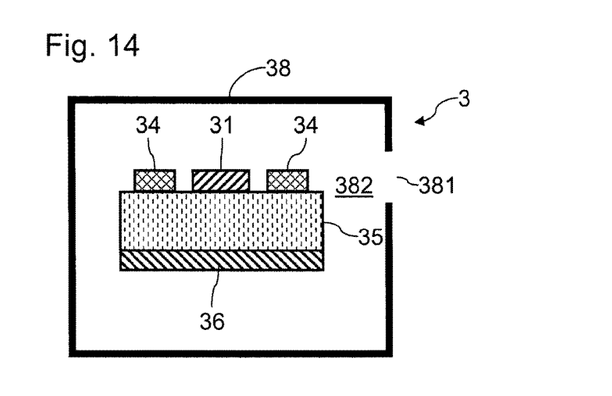
FIG. 14 is a view in cross section of another alternative form of resonator according to the first embodiment.

FIG. 14 illustrates a view in cross section of the adaptation of an enclosed space 38 to suit the first alternative form of the first embodiment of resonator 3. The enclosed space 38 delimits a chamber 382 in which the resonator 3 is housed. The enclosed space 38 has an opening 381 allowing the gas the pressure of which is to be measured to enter the chamber 382. The resonator 3 here has a minimum of contact with the enclosed space 38, so that its temperature is not perturbed.

Figure 15:
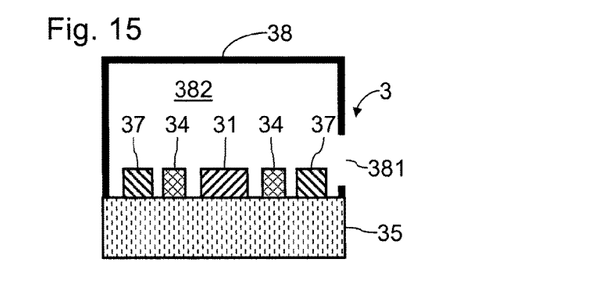
FIG. 15 is a view in cross section of another alternative form of resonator according to the second embodiment.

FIG. 15 illustrates a view in cross section of the adaptation of an enclosed space 38 to the first alternative form of the second embodiment of resonator 3. The enclosed space 38 delimits a chamber 382 in which the resonator 3 is housed. The enclosed space 38 comprises an opening 381 allowing the gas the pressure of which is to be measured to enter the chamber 382. The layer of dielectric material 35 forms one wall of the enclosed space 38. The remainder of the space is formed by a cover attached against the dielectric material. This cover may, for example, be formed of a machined or micromachined substrate.

Figure 16:
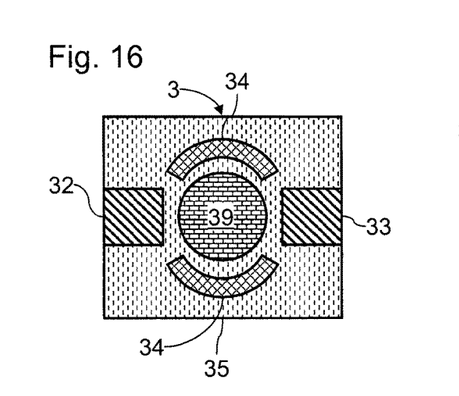
FIGS. 16 and 17 are respectively a view from above and a view from the side of a third embodiment of resonator for a sensor according to the invention.
Figure 17:
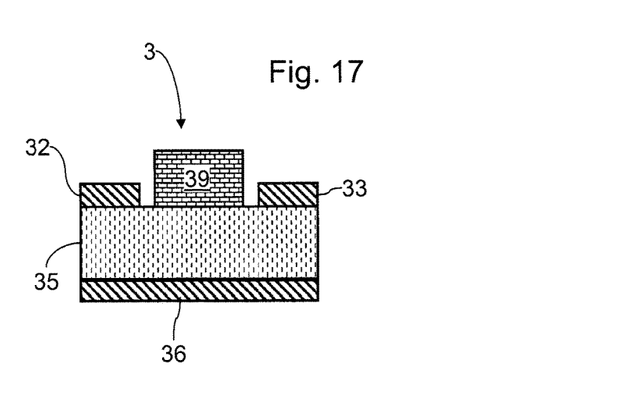

FIGS. 16 and 17 are respectively views from above and in cross section of a third embodiment of resonator 3 for a sensor 1 according to the invention. The resonator 3 here is of the dielectric resonator type. The resonator 3 here comprises a block 39 of dielectric material, this block 39 forming the resonant element of the resonator 3. The block 39 is formed on a layer 35 of dielectric material of a waveguide. The block 39 of dielectric material has a dielectric permittivity that varies with temperature, as in the embodiments described beforehand. Two conducting electrodes 32 and 33 are formed on the upper surface of the layer 35 of dielectric material of the waveguide, longitudinally on either side of the block 39. The conducting electrodes 32 and 33 are electromagnetically coupled to the block 39. Heating resistances 34 are formed on the upper surface of the layer of dielectric material 35, transversely on either side of the block 39. The block 39 here has a cylindrical shape with a generatrix extending along the normal to the layer of dielectric material 35. The block 39 has a circular cross section. The heating resistances 34 have a shape that is curved around the contour of the block 39.

In the various embodiments, at least one layer of the waveguide is formed of a dielectric material that has a dielectric permittivity that varies with temperature. For example, in the context of the invention, the temperature coefficient of permittivity TC∈r has a value equal to at least to 80 ppm/° C. in absolute value, advantageously at least 1000 ppm/° C., and in certain instances at least 10,000 ppm/° C. The higher the value of the temperature coefficient of permittivity of the dielectric material TC∈r, the higher the sensitivity that the sensor 1 can exhibit.

The person skilled in the art usually seeks to obtain resonators the dielectric permittivity of which does not vary with temperature, so as to achieve optimum stability in the resonant frequency thereof. The invention encourages the reverse effect, by seeking a strong variation in dielectric permittivity with temperature.

With known materials, it is notably possible to conceive of measuring pressures below 1 Pa, and down to around $10^{-3}$ Pa, using a sensor 1 according to the invention. Thus, the variation in the frequency of the measured signal, for a given variation in pressure, is markedly higher than that which could be obtained for pressure sensors of the prior art. In consequence, such a sensor 1 is markedly less sensitive to measurement noise. In particular, a variation in resonant frequency in a radiofrequency range makes it possible to obtain large variations in resonant frequency readily detectable.

Advantageously, the layer of dielectric material, the dielectric constant of which varies with temperature, has a crystalline structure of the perovskite type. This material may be selected from the group comprising: PZT, BST, $Pb(Mg_{1/2}W_{1/2})O_3$, $Pb(Ni_{1/3}Nb_{2/3})O_3$, $Pb(ZrTi)O_3$.

The waveguide heating device detailed in the foregoing alternative forms relies on one or more heating resistances 34 in contact with the layer of dielectric material or having a thermal bridge to this layer of dielectric material. Such heating resistances can be made with small sizes compatible with the dimensions of the resonator 3. Such resistances 34 may easily be implanted as close as possible to the resonant element 31 or 39. The resistances 34 may take any shape that is suited to be positioned as close as possible to the resonant element 31 or 39.

Resistances 34 may be produced from the same metal as a conducting resonant element 31, for example to make it easier for them to be manufactured during the same steps in the production process. However, it is also possible to conceive of a radiative heating device, for example using infrared or laser illumination of the layer of dielectric material.

The heating device may advantageously be designed to heat the waveguide to a temperature of between 80 and 200° C. in a vacuum. This then provides a temperature which is readily influenced by the pressure of the gas, without the heating giving rise to unwanted gas flows.

The layer of dielectric material 35 is advantageously in direct contact with the gas the pressure of which is to be measured. However, it is also conceivable for this layer of dielectric material 35 to be coated with thermally conductive materials in direct contact with the gas the pressure of which is to be measured, so as to improve the exchange of heat between this gas and the waveguide.

Such a sensor 1 can be produced on a macro-scale or may be incorporated into microelectromechanical or nanoelectromechanical systems. Advantageously, the operating frequency of the resonator 3 is between 100 MHz and 100 GHz, so as to have a very good compromise between the space occupied by the resonator 3, the measurement sensitivity and the complexity of the electronic circuits of the active system 2 and of the device 4 that determines the electromagnetic resonant frequency.

Such a resonator 3 may be produced using conventional microelectronics or nanoelectronics technological steps, and may for example be formed on a substrate compatible with deposition, etching and lithography techniques.

The invention claimed is:

1. A pressure sensor, said pressure sensor comprising: an electromagnetic resonator with a waveguide comprising a dielectric material having a dielectric permittivity that varies with temperature; an excitation circuit configured to propagate an electromagnetic field through said waveguide; a device for heating said resonator; a device for detecting an electromagnetic resonant frequency of the resonator; and a device for determining a pressure of a gas surrounding the sensor as a function of the detected electromagnetic resonant frequency.

2. The pressure sensor according to claim 1, in which said dielectric material has a temperature coefficient of permittivity at least equal to 80 ppm/° C.

3. The pressure sensor according to claim 1, in which said dielectric material has a crystalline structure of the perovskite type.

4. The pressure sensor according to claim 1, in which said dielectric material comprises a superposition of several layers of materials of which at least one has a dielectric permittivity that varies with temperature.

5. The pressure sensor according to claim 1, further comprising a cavity created to receive a gas, the pressure of which is to be measured, said electromagnetic resonator being at least partially housed in this cavity.

6. The pressure sensor according to claim 5, in which the resonator comprises a front face and a rear face, said front face being positioned in said cavity in direct contact with the gas, the pressure of which is to be measured, and wherein said rear face is arranged outside the cavity.

7. The pressure sensor according to claim 1, in which the device for heating said resonator is configured to heat said dielectric material to a temperature of between 80 and 200° C.

8. The pressure sensor according to claim 1, in which the heating device comprises a heating resistance in contact with said dielectric material.

9. The pressure sensor according to claim 1, in which said device for detecting the electromagnetic resonant frequency of the resonator measures the frequency of electrical resonance of an oscillating circuit including said resonator and said excitation circuit.

10. The pressure sensor according to claim 1, wherein said resonator comprises a dielectric waveguide that comprises a block of dielectric material; and two conducting electrodes electromagnetically coupled to the block, said excitation circuit being connected to said electrodes.

11. The pressure sensor according to claim 1, wherein said resonator comprises a coplanar waveguide, wherein said coplanar waveguide comprises a conducting micro strip; two ground traces on the same plane as the conducting micro strip; and a dielectric on which the two ground traces and the conducting micro strip are arranged; wherein the detection device and the excitation circuit comprise at least one conducting electrode electromagnetically coupled to the micro strip and to the two ground traces.

12. The pressure sensor according to claim 1, wherein said excitation circuit is configured to propagate an electromagnetic field having a frequency at least equal to 100 MHz through said resonator.

13. The pressure sensor according to claim 1, wherein said resonator comprises a micro-strip waveguide, wherein, said micro-strip waveguide comprises a conducting micro strip and a ground plane made of conducting material, wherein the dielectric material that has a dielectric permittivity that varies with temperature is arranged between the ground plane the conducting micro strip; and wherein the detection device and the excitation circuit comprise at least one conducting electrode electromagnetically coupled to the micro strip via said dielectric material.

14. The pressure sensor according to claim 13, further comprising two conducting electrodes, the detection device and the excitation circuit respectively comprising one of said electrodes.

15. A method for measuring a pressure of a gas, said method comprising: placing an electromagnetic resonator in thermal contact with the gas, the electromagnetic resonator including a waveguide comprising a dielectric material that has a dielectric permittivity that varies with temperature; heating said resonator; electromagnetically exciting an electromagnetic wave that propagate through said waveguide; detecting an electromagnetic resonant frequency of the resonator that has propagated through said waveguide; and determining the pressure of the gas as a function of the detected electromagnetic resonant frequency.

* * * * *